US012488737B2

(12) United States Patent
Ha et al.

(10) Patent No.: US 12,488,737 B2
(45) **Date of Patent: *Dec. 2, 2025**

(54) DISPLAY DEVICE AND METHOD OF DRIVING THE SAME

(71) Applicant: Samsung Display Co., Ltd., Yongin-Si (KR)

(72) Inventors: Tae-Seok Ha, Yongin-si (KR); Woon-Rok Jang, Yongin-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/645,394

(22) Filed: Apr. 25, 2024

(65) Prior Publication Data

US 2025/0006112 A1 Jan. 2, 2025

(30) Foreign Application Priority Data

Jun. 27, 2023 (KR) ........................ 10-2023-0082759

(51) Int. Cl.
*G09G 3/32* (2016.01)

(52) U.S. Cl.
CPC ....... *G09G 3/32* (2013.01); *G09G 2310/0267* (2013.01); *G09G 2310/0275* (2013.01); *G09G 2320/0233* (2013.01); *G09G 2330/021* (2013.01)

(58) Field of Classification Search
None
See application file for complete search history.

(56) References Cited

U.S. PATENT DOCUMENTS

| | | | | |
|---|---|---|---|---|
| 9,111,491 | B2 * | 8/2015 | Woo | G09G 3/3291 |
| 9,672,769 | B2 * | 6/2017 | Lee | G09G 3/3216 |
| 10,551,903 | B2 * | 2/2020 | An | G06F 1/3265 |
| 11,127,351 | B2 * | 9/2021 | Miwa | G09G 3/3258 |
| 11,170,720 | B2 * | 11/2021 | Chiang | G09G 3/3614 |
| 11,521,544 | B2 * | 12/2022 | Park | G09G 3/32 |
| 11,640,791 | B2 | 5/2023 | Ha et al. | |
| 11,676,536 | B2 * | 6/2023 | Chae | G09G 3/3233 345/204 |

(Continued)

FOREIGN PATENT DOCUMENTS

| | | | |
|---|---|---|---|
| KR | 10-2021-0080789 | A | 7/2021 |
| KR | 10-2022-0094877 | A | 7/2022 |

(Continued)

*Primary Examiner* — Fred Tzeng
(74) *Attorney, Agent, or Firm* — Innovation Counsel LLP

(57) ABSTRACT

A display device includes a display panel including a pixel, a gate driver to provide a scan signal and a sensing signal to the pixel, a data driver to provide a data voltage to the pixel, a power manager to provide an initialization voltage to the pixel, and a controller to control the gate driver, the data driver, and the power manager. The gate driver provides the scan signal and the sensing signal to the pixel in an active period, and provides the sensing signal to the pixel in an initialization period. The controller determines an overlapping period in which the active period and the initialization period overlap each other based on a progress time of the initialization period at a start time point of the active period. The power manager changes a voltage level of the initialization voltage in the overlapping period.

20 Claims, 8 Drawing Sheets

(56) References Cited

U.S. PATENT DOCUMENTS

| | | | | | |
|---|---|---|---|---|---|
| 11,984,082 | B2 * | 5/2024 | Bae | G09G 3/3233 | |
| 2003/0179221 | A1 * | 9/2003 | Nitta | G09G 3/3648 | 345/690 |
| 2007/0242019 | A1 * | 10/2007 | Jung | G09G 3/3688 | 345/98 |
| 2020/0051509 | A1 * | 2/2020 | Bae | G09G 3/3266 | |
| 2020/0251062 | A1 * | 8/2020 | Yeh | G09G 3/3688 | |
| 2021/0327356 | A1 * | 10/2021 | Zhang | G09G 3/3275 | |
| 2022/0068194 | A1 * | 3/2022 | Kim | G09G 3/32 | |
| 2022/0262295 | A1 * | 8/2022 | Kim | G09G 3/2007 | |
| 2024/0071286 | A1 * | 2/2024 | Lee | G09G 3/2096 | |
| 2024/0257752 | A1 * | 8/2024 | Bae | G09G 3/3233 | |
| 2024/0312395 | A1 * | 9/2024 | Kim | G09G 3/2007 | |

FOREIGN PATENT DOCUMENTS

| | | | |
|---|---|---|---|
| KR | 10-2022-0140062 | A | 10/2022 |
| KR | 10-2022-0152481 | A | 11/2022 |

* cited by examiner

DISPLAY DEVICE AND METHOD OF DRIVING THE SAME

CROSS-REFERENCE TO RELATED APPLICATION(S)

This application claims priority under 35 USC § 119 to Korean Patent Application No. 10-2023-0082759 filed on Jun. 27, 2023, in the Korean Intellectual Property Office (KIPO), the entire disclosure of which is incorporated by reference herein.

BACKGROUND

1. Field

Embodiments relate to a display device. More particularly, embodiments related to a display device driven by a variable driving frequency, and a method of driving the display device.

2. Description of the Related Art

A display device may be driven at a variable driving frequency. When the display device is driven at a low driving frequency, power consumption of the display device may be reduced. When the display device is driven at a high driving frequency, the display device may provide high quality images.

The display device may include a plurality of pixels configured to display an image. The pixel may include a driving transistor configured to generate a driving current, and a light emitting diode configured to emit a light based on the driving current. A luminance of the light emitted from the light emitting diode may correspond to a magnitude of the driving current.

SUMMARY

Embodiments provide a display device in which a luminance difference within a display panel is reduced.

Embodiments provide a method of driving a display device for reducing a luminance difference within a display panel.

A display device according to embodiments may include a display panel including a pixel, a gate driver configured to provide a scan signal and a sensing signal to the pixel, a data driver configured to provide a data voltage to the pixel, a power manager configured to provide an initialization voltage to the pixel, and a controller configured to control the gate driver, the data driver, and the power manager. The gate driver may be configured to provide the scan signal and the sensing signal to the pixel in an active period in which the data voltage is provided to the pixel, and provide the sensing signal to the pixel in an initialization period that repeatedly starts during a blank period in which the data voltage is not provided to the pixel. The controller may be configured to determine an overlapping period in which the active period and the initialization period overlap each other based on a progress time of the initialization period at a start time point of the active period. The power manager may be configured to change a voltage level of the initialization voltage in the overlapping period.

In an embodiment, the power manager may be configured to reduce the voltage level of the initialization voltage in the overlapping period.

In an embodiment, a length of the overlapping period may have a value obtained by subtracting the progress time of the initialization period from a length of the active period.

In an embodiment, the controller may be configured to calculate the progress time of the initialization period by counting a clock signal from a start time point of the initialization period to the start time point of the active period.

In an embodiment, a length of the blank period may be altered according to a driving frequency.

In an embodiment, the length of the blank period may gradually increase as the driving frequency decreases.

In an embodiment, the pixel includes a first transistor including a gate electrode connected to a first node, a first electrode configured to receive a first power voltage, and a second electrode connected to a second node, a second transistor including a gate electrode configured to receive the scan signal, a first electrode configured to receive the data voltage, and a second electrode connected to the first node, a third transistor including a gate electrode configured to receive the sensing signal, a first electrode configured to receive the initialization voltage, and a second electrode connected to the second node, a storage capacitor including a first electrode connected to the first node and a second electrode connected to the second node, and a light emitting diode including a first electrode connected to the second node and a second electrode configured to receive a second power voltage.

A display device according to embodiments may include a display panel including a pixel, a gate driver configured to provide a scan signal and a sensing signal to the pixel, a data driver configured to provide a data voltage to the pixel, a power manager configured to provide an initialization voltage to the pixel, and a controller configured to control the gate driver, the data driver, and the power manager. The gate driver may be configured to provide the scan signal and the sensing signal to the pixel in an active period in which the data voltage is provided to the pixel, and provide the sensing signal to the pixel in an initialization period that repeatedly starts during a blank period in which the data voltage is not provided to the pixel. The controller may be configured to determine an overlapping period in which the active period and the initialization period overlap each other based on a progress time of the initialization period at a start time point of the active period. The power manager may be configured to change a voltage level of the data voltage in the overlapping period.

In an embodiment, the data driver may be configured to increase the voltage level of the data voltage in the overlapping period.

In an embodiment, the power manager may be configured to maintain a voltage level of the initialization voltage in the overlapping period.

In an embodiment, a length of the overlapping period may have a value obtained by subtracting the progress time of the initialization period from a length of the active period.

In an embodiment, the controller may be configured to calculate the progress time of the initialization period by counting a clock signal from a start time point of the initialization period to the start time point of the active period.

In an embodiment, a length of the blank period may be altered according to a driving frequency.

In an embodiment, the length of the blank period may gradually increase as the driving frequency decreases.

In an embodiment, the pixel may include a first transistor including a gate electrode connected to a first node, a first electrode configured to receive a first power voltage, and a second electrode connected to a second node, a second transistor including a gate electrode configured to receive the scan signal, a first electrode configured to receive the data voltage, and a second electrode connected to the first node, a third transistor including a gate electrode configured to receive the sensing signal, a first electrode configured to receive the initialization voltage, and a second electrode connected to the second node, a storage capacitor including a first electrode connected to the first node and a second electrode connected to the second node, and a light emitting diode including a first electrode connected to the second node and a second electrode configured to receive a second power voltage.

A method of driving a display device according to embodiments may include providing a scan signal and a sensing signal to a pixel in a first active period, providing the sensing signal to the pixel in an initialization period that repeatedly starts during a blank period following the first active period, determining whether a second active period and the initialization period overlap each other based on a progress time of the initialization period at a start time point of the second active period following the blank period, and changing a voltage level of an initialization voltage provided to the pixel or a voltage level of a data voltage provided to the pixel in an overlapping period in which the second active period and the initialization period overlap each other.

In an embodiment, the voltage level of the initialization voltage may be reduced in the overlapping period.

In an embodiment, in the overlapping period, the voltage level of the data voltage may increase, and the voltage level of the initialization voltage may be maintained.

In an embodiment, a length of the overlapping period may have a value obtained by subtracting the progress time of the initialization period from a length of the second active period.

In an embodiment, the method may further include calculating a progress time of the blank period by counting a clock signal from a start time point of the blank period. The initialization period may repeatedly start when the progress time of the blank period is greater than a predetermined time.

In the display device and the method of driving the display device according to the embodiments, the voltage level of the initialization voltage or the voltage level of the data voltage, which is provided to the pixel, may be changed in the overlapping period in which the active period and the initialization period overlap each other, so that a driving current of the pixel may be compensated for, and a luminance difference within the display panel may be reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Figure 1:
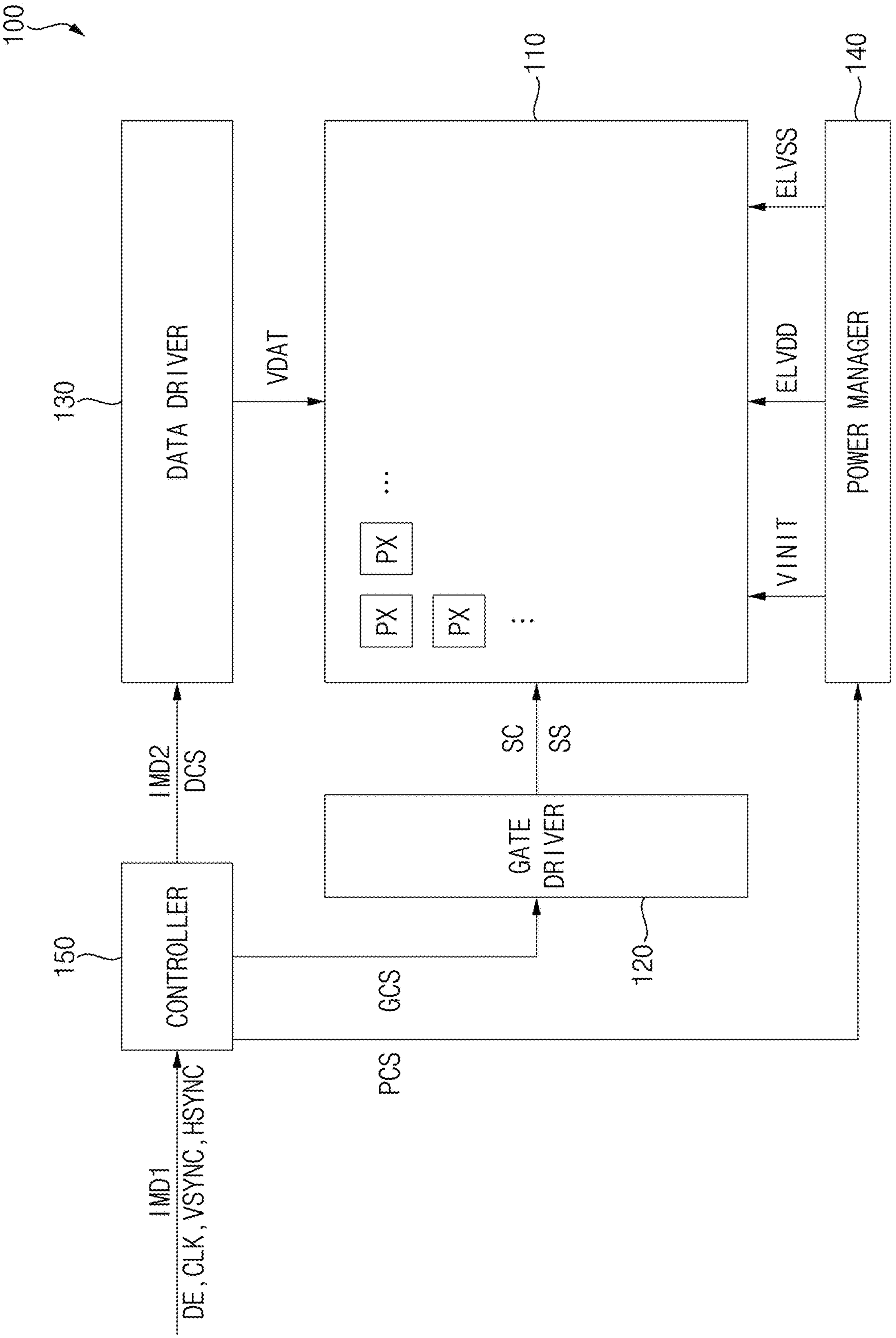
FIG. 1 is a block diagram showing a display device 100 according to an embodiment of the present disclosure.

Hereinafter, a display device and a method of driving a display device according to embodiments of the present disclosure will be described in more detail with reference to the accompanying drawings. The same or similar reference numerals will be used for the same elements in the accompanying drawings.

FIG. 1 is a block diagram showing a display device 100 according to an embodiment of the present disclosure.

Referring to FIG. 1, a display device 100 may include a display panel 110, a gate driver 120, a data driver 130, a power manager 140, and a controller 150.

The display panel 110 may include pixels PX. According to an embodiment, the pixels PX may include a first pixel, a second pixel, and a third pixel which are configured to display mutually different colors. For example, the first pixel may display a red color, the second pixel may display a green color, and the third pixel may display a blue color.

The gate driver 120 may provide scan signals SC and sensing signals SS to the pixels PX. The gate driver 120 may generate the scan signals SC and the sensing signals SS based on a gate control signal GCS. The gate control signal GCS may include a gate start signal, a gate clock signal, and the like.

The data driver 130 may provide data voltages VDAT to the pixels PX. The data driver 130 may generate the data voltages VDAT based on second image data IMD2 and a data control signal DCS. The second image data IMD2 may include grayscale values for the pixels PX. The data control signal DCS may include a data clock signal, a horizontal start signal, a load signal, and the like.

The power manager 140 may provide an initialization voltage VINIT, a first power voltage ELVDD, and a second power voltage ELVSS to the pixels PX. A voltage level of the first power voltage ELVDD may be higher than a voltage level of the second power voltage ELVSS. The power manager 140 may generate the initialization voltage VINIT, the first power voltage ELVDD, and the second power voltage ELVSS based on a power control signal PCS.

The controller 150 may control driving (or an operation) of the gate driver 120, driving (or an operation) of the data driver 130, and driving (or an operation) of the power manager 140. The controller 150 may generate the second image data IMD2, the gate control signal GCS, the data control signal DCS, and the power control signal PCS based on first image data IMD1 and a control signal. The controller 150 may receive the first image data IMD1 and the control signal from an external device (e.g., a processor). The first image data IMD1 may include the grayscale values for the pixels PX. The control signal may include a data enable signal DE, a clock signal CLK, a vertical synchronization signal VSYNC, a horizontal synchronization signal HSYNC, and the like.

Figure 2:
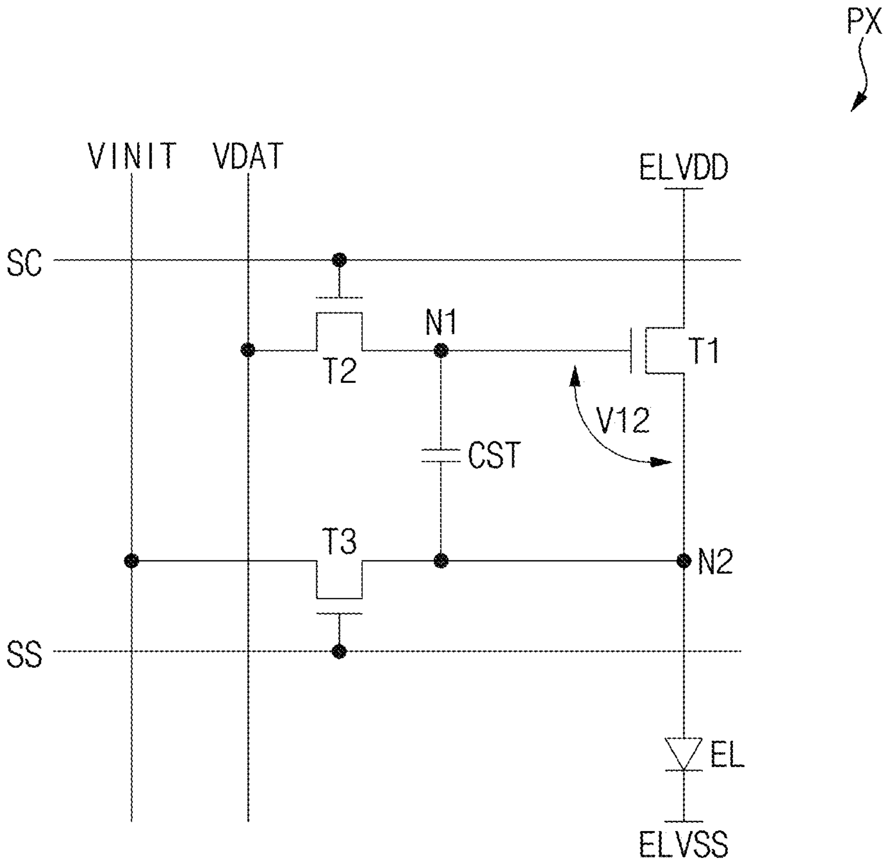
FIG. 2 is a circuit diagram showing a pixel PX included in the display device 100 of FIG. 1.

FIG. 2 is a circuit diagram showing a pixel PX included in the display device 100 of FIG. 1.

Referring to FIG. 2, the pixel PX may receive the scan signal SC, the sensing signal SS, the data voltage VDAT, the initialization voltage VINIT, the first power voltage ELVDD, and the second power voltage ELVSS. The pixel PX may include a first transistor T1, a second transistor T2, a third transistor T3, a storage capacitor CST, and a light emitting diode EL.

The first transistor T1 may include a gate electrode connected to a first node N1, a first electrode configured to receive a first power voltage ELVDD, and a second electrode connected to a second node N2. The first transistor T1 may generate a driving current based on a voltage difference V12 between the first node N1 and the second node N2. The first transistor T1 may be referred to as a driving transistor.

The second transistor T2 may include a gate electrode configured to receive the scan signal SC, a first electrode configured to receive the data voltage VDAT, and a second electrode connected to the first node N1. The second transistor T2 may provide the data voltage VDAT to the first node N1 in response to the scan signal SC. The second transistor T2 may be referred to as a switching transistor or a write transistor.

The third transistor T3 may include a gate electrode configured to receive the sensing signal SS, a first electrode configured to receive the initialization voltage VINIT, and a second electrode connected to the second node N2. The third transistor T3 may provide the initialization voltage VINIT to the second node N2 in response to the sensing signal SS. The third transistor T3 may be referred to as an initialization transistor or a sensing transistor.

Although an embodiment in which each of the first transistor T1, the second transistor T2, and the third transistor T3 is an N-type transistor (e.g., an NMOS transistor) has been shown in FIG. 2, the present disclosure is not limited thereto. According to another embodiment, at least one of the first transistor T1, the second transistor T2, and the third transistor T3 may be a P-type transistor (e.g., PMOS transistor).

The storage capacitor CST may include a first electrode connected to the first node N1, and a second electrode connected to the second node N2. The storage capacitor CST may store the voltage difference V12 between the first node N1 and the second node N2.

Although an embodiment in which the pixel PX includes three transistors and one capacitor has been shown in FIG. 2, the present disclosure is not limited thereto. According to another embodiment, the pixel PX may include two transistors or four or more transistors, and/or two or more capacitors.

The light emitting diode EL may include a first electrode (or an anode) connected to the second node N2, and a second electrode (or a cathode) configured to receive a second power voltage ELVSS. The light emitting diode EL may emit a light based on the driving current provided from the first transistor T1.

According to an embodiment, the light emitting diode EL may be an organic light emitting diode. According to another embodiment, the light emitting diode EL may be an inorganic light emitting diode or a quantum dot light emitting diode.

Figure 3:
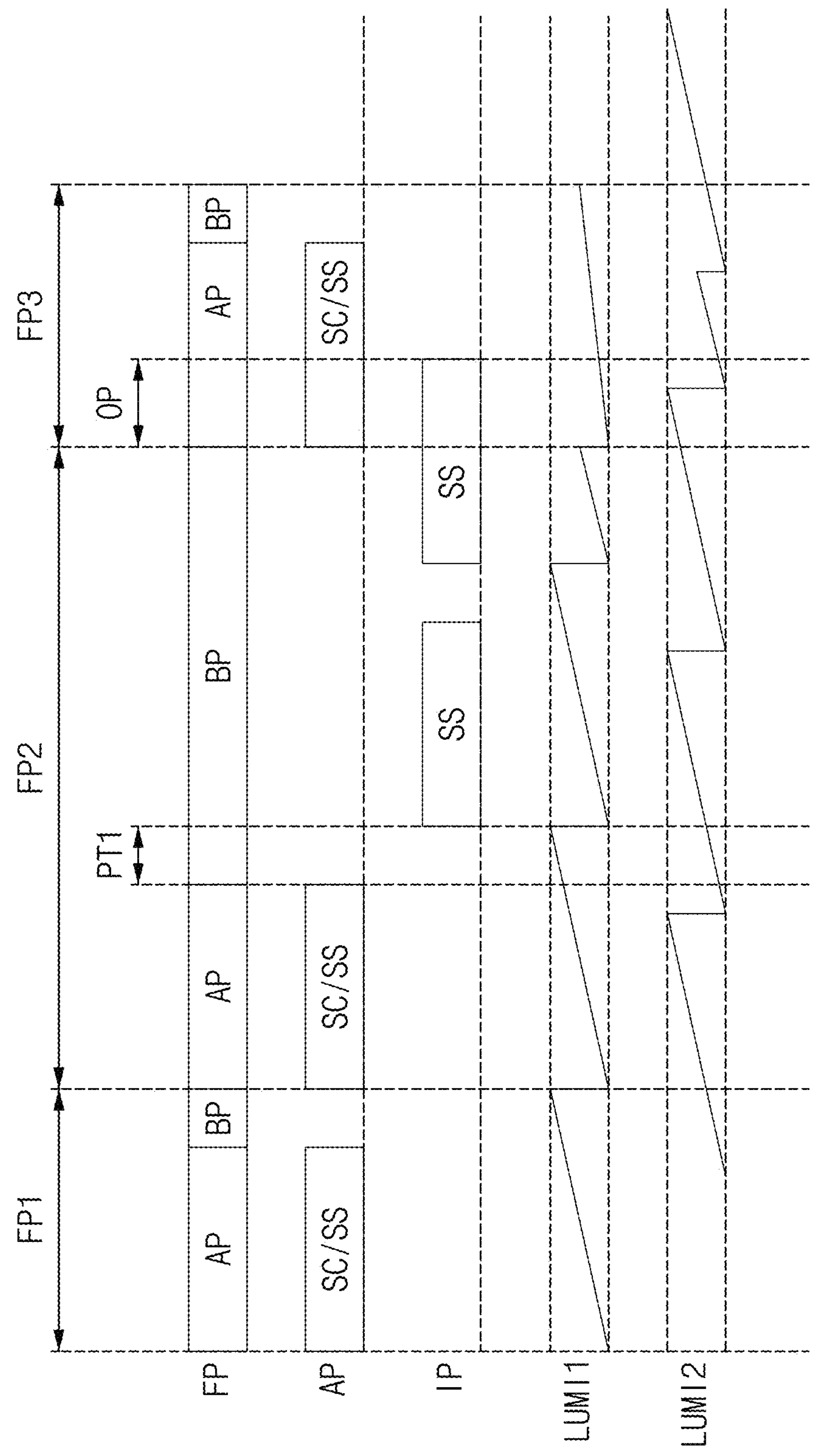
FIG. 3 is a view for describing an operation of the display device 100 of FIG. 1.

FIG. 3 is a view for describing an operation of the display device 100 of FIG. 1.

Referring to FIGS. 1, 2, and 3, the display device 100 may display an image for each frame period FP. The frame period FP may include an active period AP and a blank period BP. The active period AP and the blank period BP may be distinguished from each other by the data enable signal DE.

In the active period AP, the data voltages VDAT may be provided to the pixels PX. The gate driver 120 may provide the scan signal SC and the sensing signal SS to the pixels PX on a pixel row during the active period AP. The pixel PX may be configured such that the data voltage VDAT is provided to the first node N1 in response to the scan signal SC, and the initialization voltage VINIT is provided to the second node N2 in response to the sensing signal SS. The pixel PX may be configured such that the first transistor T1 generates the driving current based on the charge stored in the storage capacitor CST which is the voltage difference V12 between the first node N1 and the second node N2 and which corresponds to a value VDAT-VINIT obtained by subtracting the initialization voltage VINIT from the data voltage VDAT, and the light emitting diode EL emits the light with a luminance corresponding to a magnitude of the driving current.

In the blank period BP, the data voltages VDAT may not be provided to the pixels PX. The gate driver 120 may not provide the scan signal SC to the pixels PX on a pixel row during the blank period BP.

The display device 100 may be driven at a variable driving frequency. According to an embodiment, a driving frequency of the display device 100 may be 1 hertz (Hz) to 480 Hz.

A length of the blank period BP may be altered according to the driving frequency, and a length of the active period AP may be constant regardless of the driving frequency. The length of the blank period BP may gradually increase as the driving frequency decreases. The length of the blank period BP may be gradually decreased as the driving frequency increases. According to an embodiment, as shown in FIG. 3, the display device 100 may be driven at a first driving frequency in a first frame period FP1, the display device 100 may be driven at a second driving frequency that is lower than the first driving frequency in a second frame period FP2, and the display device 100 may be driven at the first driving frequency in a third frame period FP3. In this case, the length of the blank period BP in the second frame period FP2 may be greater than each of the length of the blank period BP in the first frame period FP1 and the length of the blank period BP in the third frame period FP3.

Even when the data voltage VDAT is not provided to the pixel PX in the blank period BP, since the storage capacitor CST maintains the voltage difference V12 between the first node N1 and the second node N2, the light emitting diode EL may emit the light based on the driving current corresponding to the voltage difference V12 between the first node N1 and the second node N2 in the blank period BP. Accordingly, a luminance of the display device 100 in the second frame period FP2 in which the length of the blank period BP is longer than that of the first frame period FP1 may be greater than a luminance of the display device 100 in the first frame period FP1 in which the length of the blank period BP is shorter than the blank period BP. Therefore, even when a voltage level of the data voltage VDAT is the same, a luminance of the display device 100 driven at a low driving frequency may be greater than a luminance of the display device 100 driven at a high driving frequency.

In order to reduce a luminance difference according to the variable driving frequency, the frame period FP may include an initialization period IP. The initialization period IP may repeatedly start during the blank period BP. The controller 150 may calculate a progress time PT1 of the blank period BP by counting the clock signal CLK from a start time point of the blank period BP. The controller 150 may determine the start time point of the blank period BP based on the data enable signal DE. The controller 150 may repeatedly start the initialization period IP when the progress time PT1 of the blank period BP is greater than a predetermined time. The predetermined time may be determined in consideration of a luminance difference of the display device 100 between luminance when the display device 100 is driven at the low driving frequency and luminance when the display device 100 is driven at the high driving frequency.

The gate driver 120 may sequentially provide the sensing signal SS to the pixels PX one row at a time in the initialization period IP. During the initialization period IP, the initialization voltage VINIT is provided to the second node N2 of the pixels in response to the sensing signal SS, so that the first electrode of the light emitting diode EL may be initialized by the initialization voltage VINIT, and the light emitting diode EL may not emit the light. When the sensing signal SS is not provided after the initialization period IP, the first transistor T1 may generate the driving current again based on the voltage difference V12 between the first node N1 and the second node N2 stored in the storage capacitor CST, and the light emitting diode EL may emit the light again based on the driving current. Since the initialization period IP repeatedly starts during the blank period BP, the luminance of the display device 100 driven at the low driving frequency in which the length of the blank period BP is longer than the predetermined time may be prevented from excessively increasing.

The controller 150 may determine a start time point of the active period AP based on the data enable signal DE while the blank period BP is in progress. The gate driver 120 may provide the scan signal SC and the sensing signal SS to the pixels PX one pixel row at a time in the active period AP.

As shown in FIG. 3, when the initialization period IP starts during the blank period BP in the second frame period FP2 before the active period AP in the third frame period FP3 starts, and the initialization period IP does not end at the start time point of the active period AP in the third frame period FP3. Thus, the active period AP and the initialization period IP may overlap each other. The sensing signals SS may be provided to a plurality of pixel rows (e.g., two pixel rows) in an overlapping period OP in which the active period AP and the initialization period IP overlap each other. As a load of an initialization line configured to transmit the initialization voltage VINIT increases, a voltage level of the initialization voltage VINIT provided to the pixel PX may gradually increase. In other words, a voltage level of the initialization voltage VINIT when the initialization voltage VINIT is provided to a plurality of pixel rows may be higher than a voltage level of the initialization voltage VINIT when the initialization voltage VINIT is provided to only one pixel row. Accordingly, the voltage level of the initialization voltage VINIT may be increased in the overlapping period OP, so that the voltage difference V12 between the first node N1 and the second node N2, which corresponds to the value obtained by subtracting the initialization voltage VINIT from the data voltage VDAT, may decrease, and luminance of the light emitted from the light emitting diode EL may decrease.

As shown in FIG. 3, when a front portion of the active period AP and the initialization period IP overlap each other in the third frame period FP3 while a rear portion of the active period AP and the initialization period IP do not overlap each other in the third frame period FP3, a luminance LUMI1 of an upper portion of the display panel 110 in which the sensing signal SS is provided in the front portion of the active period AP may be lower than a luminance LUMI2 of a lower portion of the display panel 110 in which the sensing signal SS is provided in the rear portion of the active period AP Accordingly, a luminance difference within the display panel 110 may increase.

Figure 4:
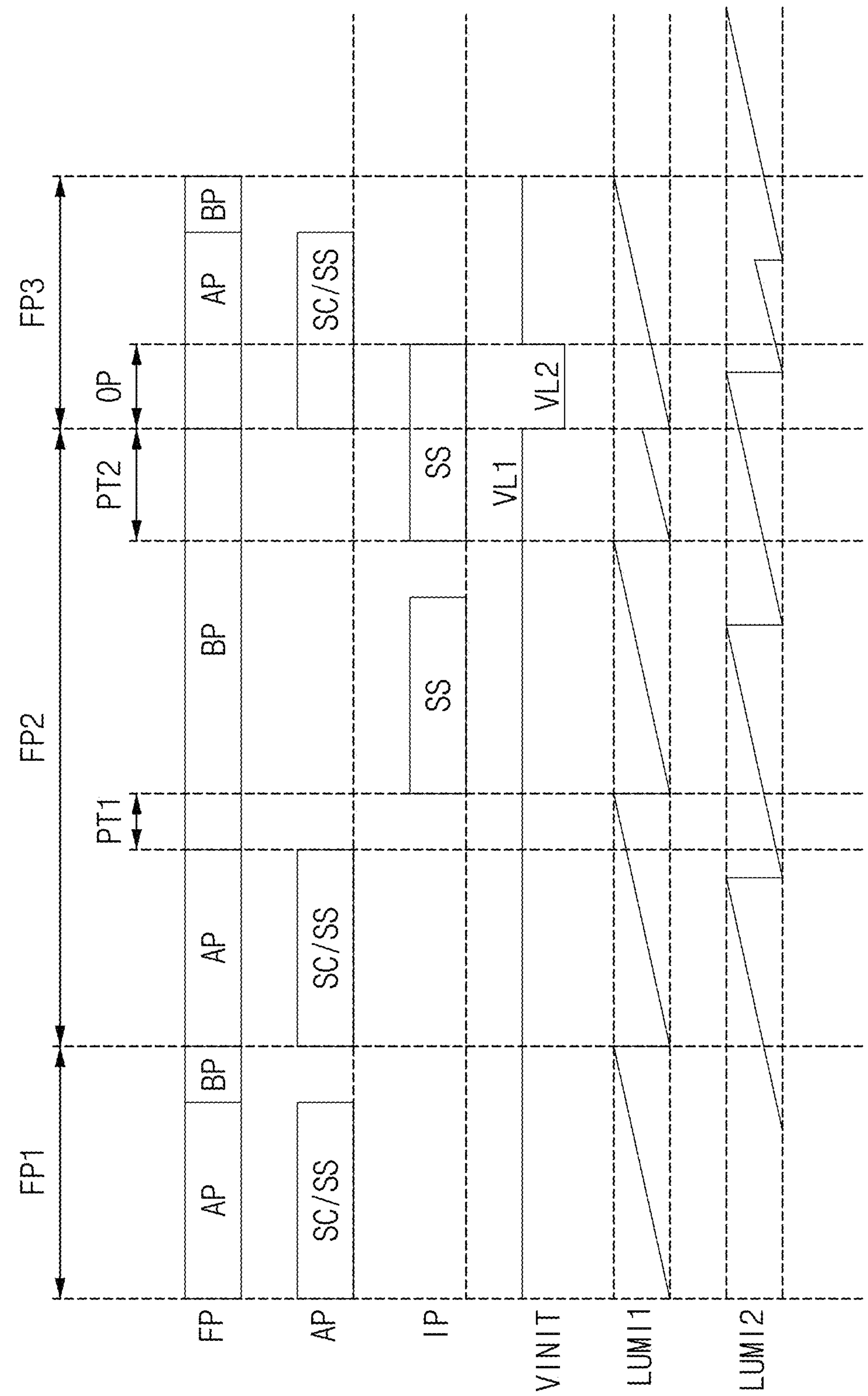
FIG. 4 is a view for describing control of an initialization voltage VINIT according to an embodiment of the present disclosure.

FIG. 4 is a view for describing control of an initialization voltage VINIT according to an embodiment of the present disclosure.

Referring to FIGS. 1, 2, and 4, the controller 150 may determine the overlapping period OP in which the active period AP and the initialization period IP overlap each other based on a progress time PT2 of the initialization period IP at the start time point of the active period AP. The controller 150 may calculate the progress time PT2 of the initialization period IP by counting the clock signal CLK from a start time point of the initialization period IP to the start time point of the active period AP.

A length of the overlapping period OP may have a value obtained by subtracting the progress time PT2 of the initialization period IP from the length of the active period AP. The length of the active period AP may be equal to a length of the initialization period IP, and a value obtained by adding the length of the overlapping period OP to the progress time PT2 of the initialization period IP may be equal to the length of the initialization period IP.

The controller 150 may generate the power control signal PCS including information on the overlapping period OP, and the power manager 140 may change the voltage level of the initialization voltage VINIT in the overlapping period OP based on the power control signal PCS.

According to an embodiment, the power manager 140 may reduce the voltage level of the initialization voltage VINIT in the overlapping period OP. The power manager 140 may reduce the voltage level of the initialization voltage VINIT from a first voltage level VL1 to a second voltage level VL2 in the overlapping period OP. However, the present disclosure is not limited thereto, and according to another embodiment, the power manager 140 may increase the voltage level of the initialization voltage VINIT in the overlapping period OP.

As described above, the sensing signals SS may be provided to the pixel rows (e.g., two pixel rows) in the overlapping period OP in which the active period AP and the initialization period IP overlap each other. As the load of the initialization line configured to transmit the initialization voltage VINIT increases, the voltage level of the initialization voltage VINIT provided to the pixel PX may gradually increase. However, as the power manager 140 reduces the voltage level of the initialization voltage VINIT in the overlapping period OP, the voltage level of the initialization voltage VINIT provided to the pixel PX when the initialization voltage VINIT is provided to a plurality of pixel rows may be substantially equal to the voltage level of the initialization voltage VINIT provided to the pixel PX when the initialization voltage VINIT is provided to only one pixel row. Accordingly, the voltage level of the initialization voltage VINIT may not increase in the overlapping period OP, so that the voltage difference V12 between the first node N1 and the second node N2, which corresponds to the value obtained by subtracting the initialization voltage VINIT from the data voltage VDAT, may not decrease, and the luminance of the light emitted from the light emitting diode EL may not decrease.

As shown in FIG. 4, when the front portion of the active period AP and the initialization period IP overlap each other in the third frame period FP3 while the rear portion of the active period AP and the initialization period IP do not overlap each other in the third frame period FP3, the luminance LUMI1 of the upper portion of the display panel 110 in which the sensing signal SS is provided in the front portion of the active period AP may be substantially equal to the luminance LUMI2 of the lower portion of the display panel 110 in which the sensing signal SS is provided in the rear portion of the active period AP. Accordingly, the luminance difference within the display panel 110 may be reduced.

Figure 5:
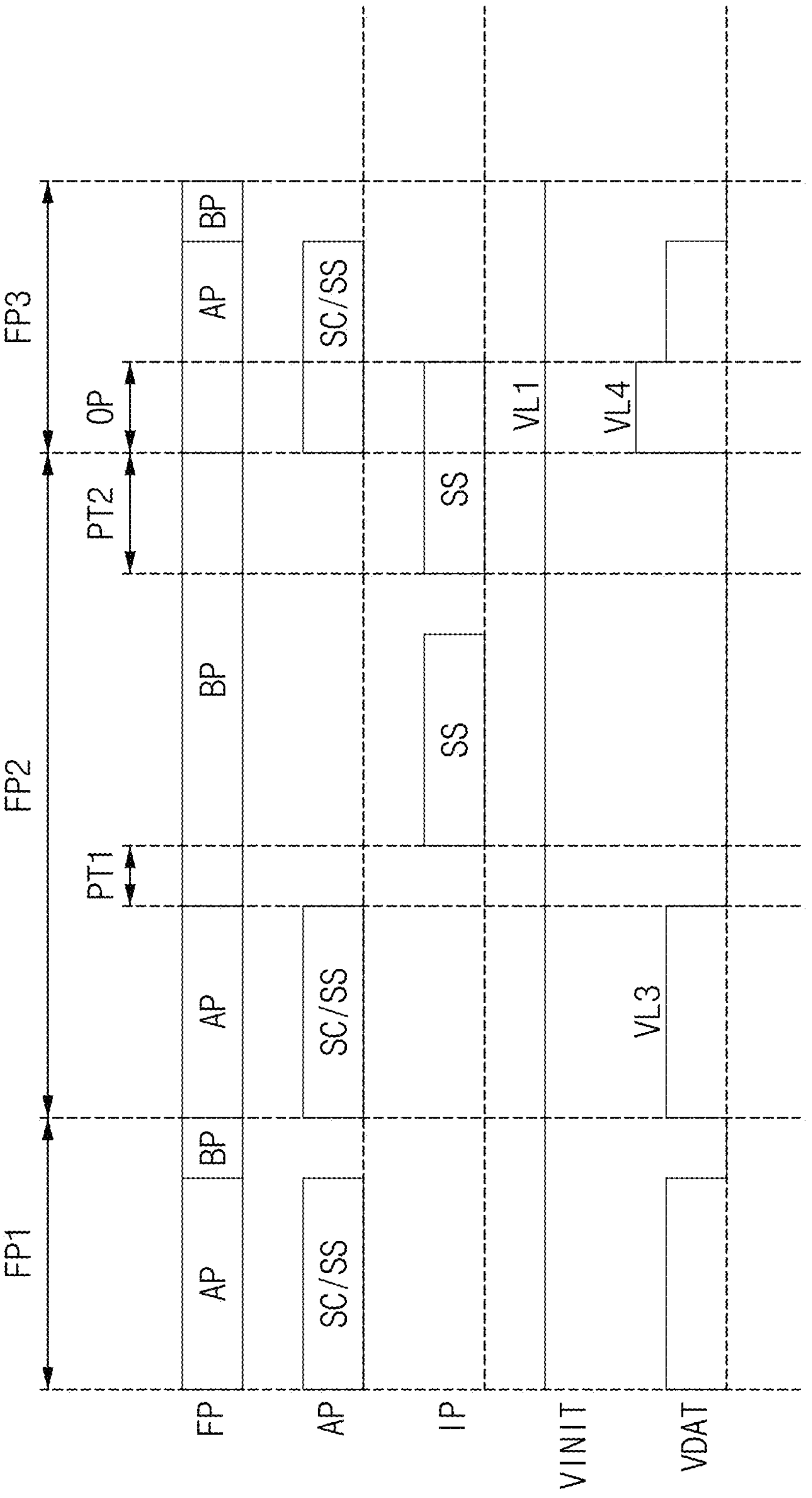
FIG. 5 is a view for describing control of a data voltage VDAT according to an embodiment of the present disclosure.

FIG. 5 is a view for describing control of a data voltage VDAT according to an embodiment of the present disclosure.

Referring to FIGS. 1, 2, and 5, the controller 150 may determine the overlapping period OP in which the active period AP and the initialization period IP overlap each other based on a progress time PT2 of the initialization period IP at the start time point of the active period AP. The controller 150 may calculate the progress time PT2 of the initialization period IP by counting the clock signal CLK from a start time point of the initialization period IP to the start time point of the active period AP.

A length of the overlapping period OP may have a value obtained by subtracting the progress time PT2 of the initialization period IP from the length of the active period AP. The length of the active period AP may be equal to a length of the initialization period IP, and a value obtained by adding the length of the overlapping period OP to the progress time PT2 of the initialization period IP may be equal to the length of the initialization period IP.

The controller 150 may generate the data control signal DCS including information on the overlapping period OP, and the data driver 130 may change the voltage level of the data voltage VDAT in the overlapping period OP based on the data control signal DCS. The power manager 140 may maintain the voltage level of the initialization voltage VINIT in the overlapping period OP.

According to an embodiment, the data driver 130 may increase the voltage level of the data voltage VDAT in the overlapping period OP. The data driver 130 may increase the voltage level of the data voltage VDAT from a third voltage level VL3 to a fourth voltage level VL4 which is greater than the third voltage level VL3 in the overlapping period OP. However, the present disclosure is not limited thereto, and according to another embodiment, the data driver 130 may reduce the voltage level of the data voltage VDAT in the overlapping period OP.

As described above, the sensing signals SS may be provided to the pixel rows (e.g., two pixel rows) in the overlapping period OP in which the active period AP and the initialization period IP overlap each other. As the load of the initialization line configured to transmit the initialization voltage VINIT increases, the voltage level of the initialization voltage VINIT provided to the pixel PX may be gradually increased. However, as the data driver 130 increases the voltage level of the data voltage VDAT in the overlapping period OP, the voltage level of the data voltage VDAT provided to the pixel PX when the initialization voltage VINIT is provided to a plurality of pixel rows may be higher than the voltage level of the data voltage VDAT provided to the pixel PX when the initialization voltage VINIT is provided to only one pixel row. Accordingly, the voltage level of the data voltage VDAT may increase in the overlapping period OP, so that the voltage difference V12 between the first node N1 and the second node N2, which corresponds to the value obtained by subtracting the initialization voltage VINIT from the data voltage VDAT, may not decrease, and the luminance of the light emitted from the light emitting diode EL may not decrease.

Figure 6:
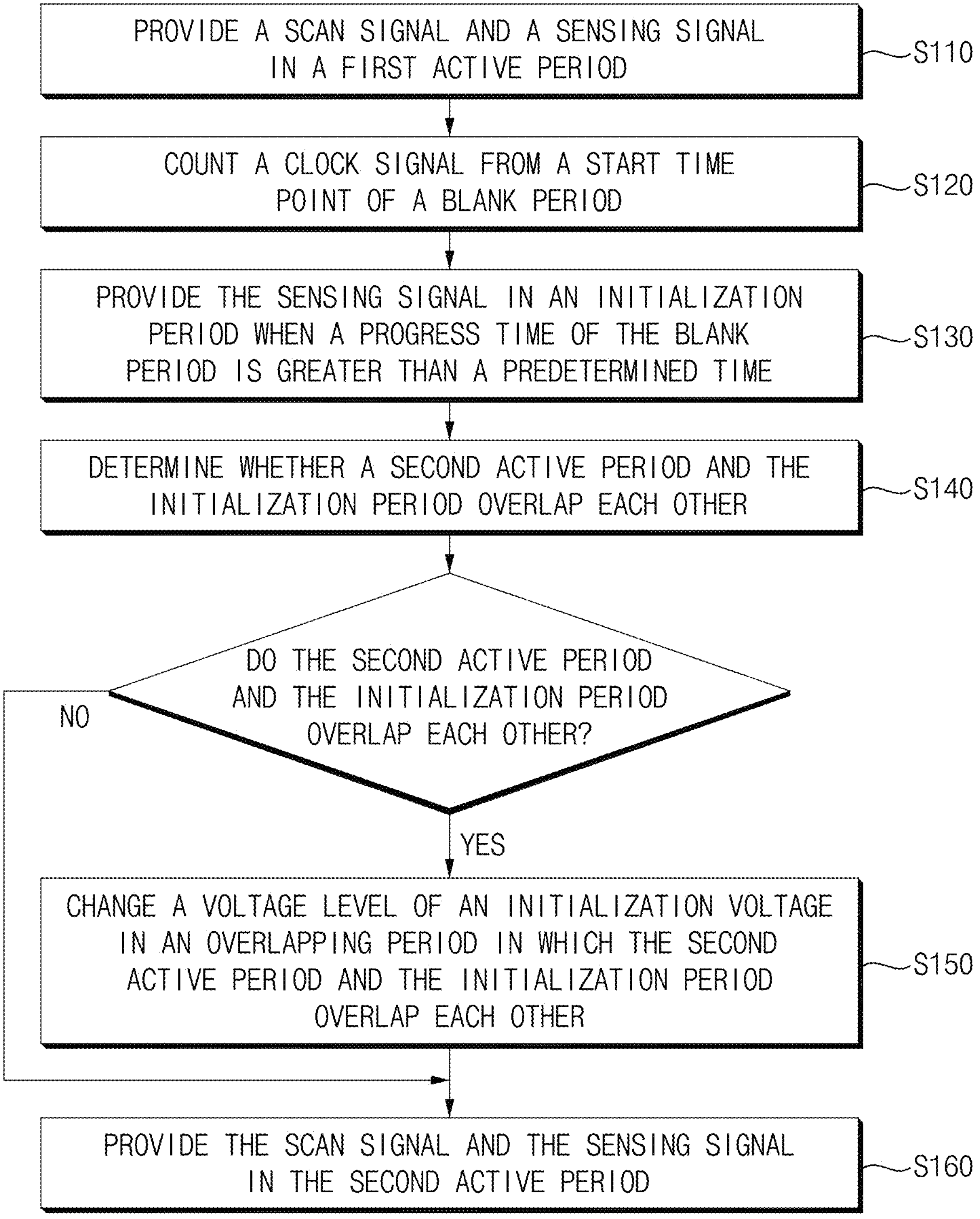
FIG. 6 is a flowchart showing a method for driving a display device 100 according to an embodiment of the present disclosure.

FIG. 6 is a flowchart showing a method for driving a display device 100 according to an embodiment of the present disclosure.

Referring to FIGS. 1, 4, and 6, according to a method for driving a display device 100, the gate driver 120 may provide a scan signal SC and a sensing signal SS to pixels PX in a pixel row during a first active period AP (S110).

The controller 150 may calculate a progress time PT1 of a blank period BP by counting a clock signal CLK from a start time point of the blank period BP following the first active period AP (S120).

The controller 150 may provide the sensing signal SS to the pixels PX in a pixel row during an initialization period IP when the progress time PT1 of the blank period BP is greater than a predetermined time (S130). The initialization period IP may repeatedly start during the blank period BP.

The controller 150 may determine whether a second active period AP and the initialization period IP overlap each other based on a progress time PT2 of the initialization period IP at a start time point of the second active period AP following the blank period BP (S140). The controller 150 may calculate the progress time PT2 of the initialization period IP by counting the clock signal CLK from a start time point of the initialization period IP to the start time point of the second active period AP. The controller 150 may determine that the second active period AP and the initialization period IP overlap each other when the progress time PT2 of the initialization period IP is less than a length of the active period AP, and may determine that the second active period AP and the initialization period IP do not overlap each other when the progress time PT2 of the initialization period IP is greater than or equal to the length of the active period AP.

When the second active period AP and the initialization period IP overlap each other, the power manager 140 may change a voltage level of the initialization voltage VINIT provided to the pixels PX in an overlapping period OP in which the second active period AP and the initialization period IP overlap each other (S150). A length of the overlapping period OP may have a value obtained by subtracting the progress time PT2 of the initialization period IP from a length of the second active period AP. When the second active period AP and the initialization period IP do not overlap each other, the power manager 140 may not change the voltage level of the initialization voltage VINIT.

According to an embodiment, the power manager 140 may reduce the voltage level of the initialization voltage VINIT in the overlapping period OP. The power manager 140 may reduce the voltage level of the initialization voltage VINIT from a first voltage level VL1 to a second voltage level VL2 which is lower than the first voltage level VL1 in the overlapping period OP. However, the present disclosure is not limited thereto, and according to another embodiment, the power manager 140 may increase the voltage level of the initialization voltage VINIT in the overlapping period OP.

The gate driver 120 may provide the scan signal SC and the sensing signal SS to the pixels PX on a pixel row during the second active period AP (S160).

Figure 7:
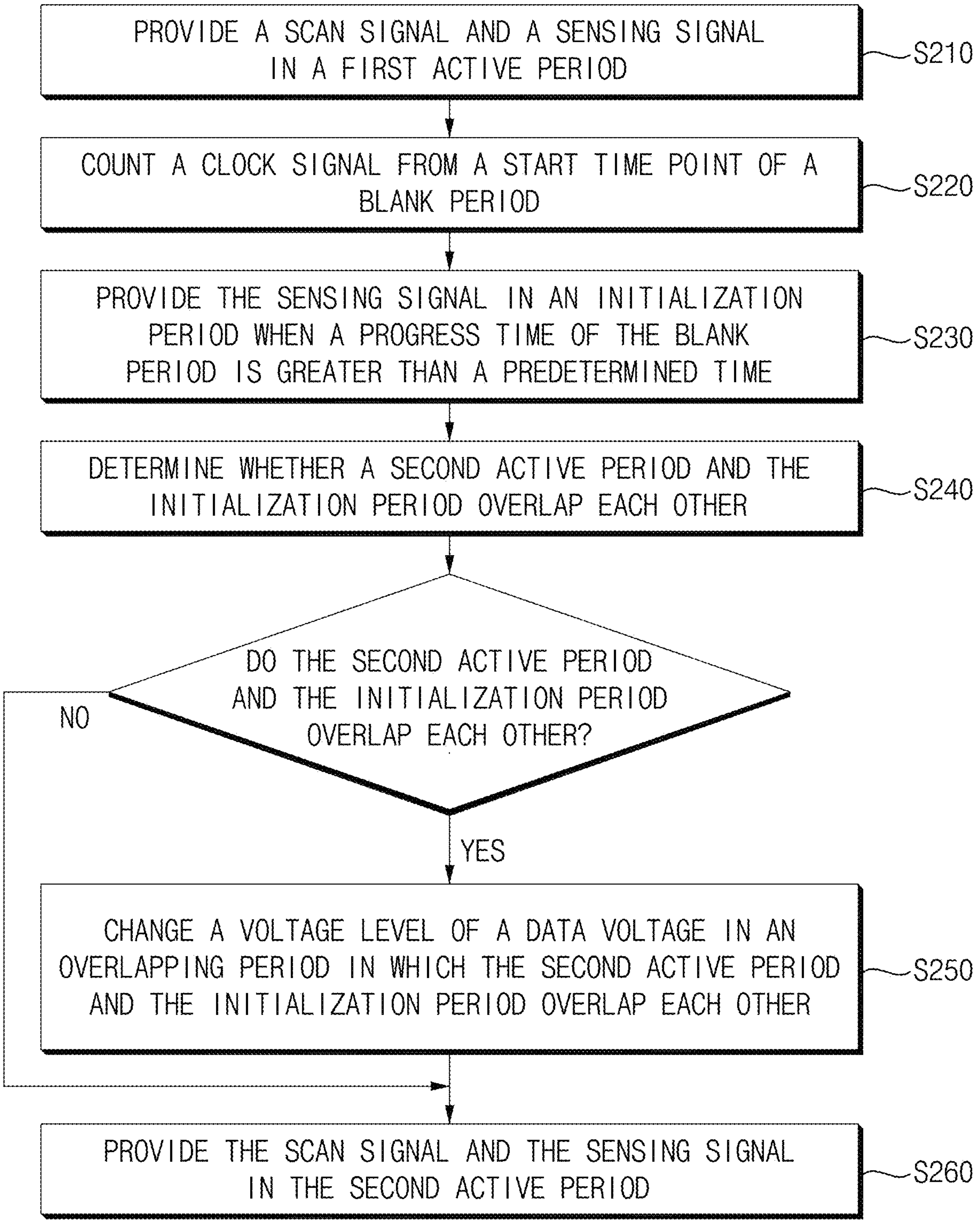
FIG. 7 is a flowchart showing a method for driving a display device according to an embodiment of the present disclosure.

FIG. 7 is a flowchart showing a method for driving a display device according to an embodiment of the present disclosure.

Referring to FIGS. 1, 5, and 7, according to a method for driving a display device 100, the gate driver 120 may provide a scan signal SC and a sensing signal SS to pixels PX in a pixel row during a first active period AP (S210).

The controller 150 may calculate a progress time PT1 of a blank period BP by counting a clock signal CLK from a start time point of the blank period BP following the first active period AP (S220).

The controller 150 may provide the sensing signal SS to the pixels PX in a pixel row during an initialization period IP when the progress time PT1 of the blank period BP is greater than a predetermined time (S230). The initialization period IP may repeatedly start during the blank period BP.

The controller 150 may determine whether a second active period AP and the initialization period IP overlap each other based on a progress time PT2 of the initialization period IP at a start time point of the second active period AP following the blank period BP (S240). The controller 150 may calculate the progress time PT2 of the initialization period IP by counting the clock signal CLK from a start time point of the initialization period IP to the start time point of the second active period AP. The controller 150 may determine that the second active period AP and the initialization period IP overlap each other when the progress time PT2 of the initialization period IP is less than a length of the active period AP, and may determine that the second active period AP and the initialization period IP do not overlap each other when the progress time PT2 of the initialization period IP is greater than or equal to the length of the active period AP.

When the second active period AP and the initialization period IP overlap each other, the data driver 130 may change a voltage level of the data voltage VDAT provided to the pixels PX in an overlapping period OP in which the second active period AP and the initialization period IP overlap each other (S250). A length of the overlapping period OP may have a value obtained by subtracting the progress time PT2 of the initialization period IP from a length of the second active period AP. The power manager 140 may maintain a voltage level of the initialization voltage VINIT in the overlapping period OP. When the second active period AP and the initialization period IP do not overlap each other, the data driver 130 may not change the voltage level of the data voltage VDAT.

According to an embodiment, the data driver 130 may increase the voltage level of the data voltage VDAT in the overlapping period OP. The data driver 130 may increase the voltage level of the data voltage VDAT from a third voltage level VL3 to a fourth voltage level VL4 in the overlapping period OP. However, the present disclosure is not limited thereto, and according to another embodiment, the data driver 130 may reduce the voltage level of the data voltage VDAT in the overlapping period OP.

The gate driver 120 may provide the scan signal SC and the sensing signal SS to the pixels PX in a pixel row during the second active period AP (S260).

Figure 8:
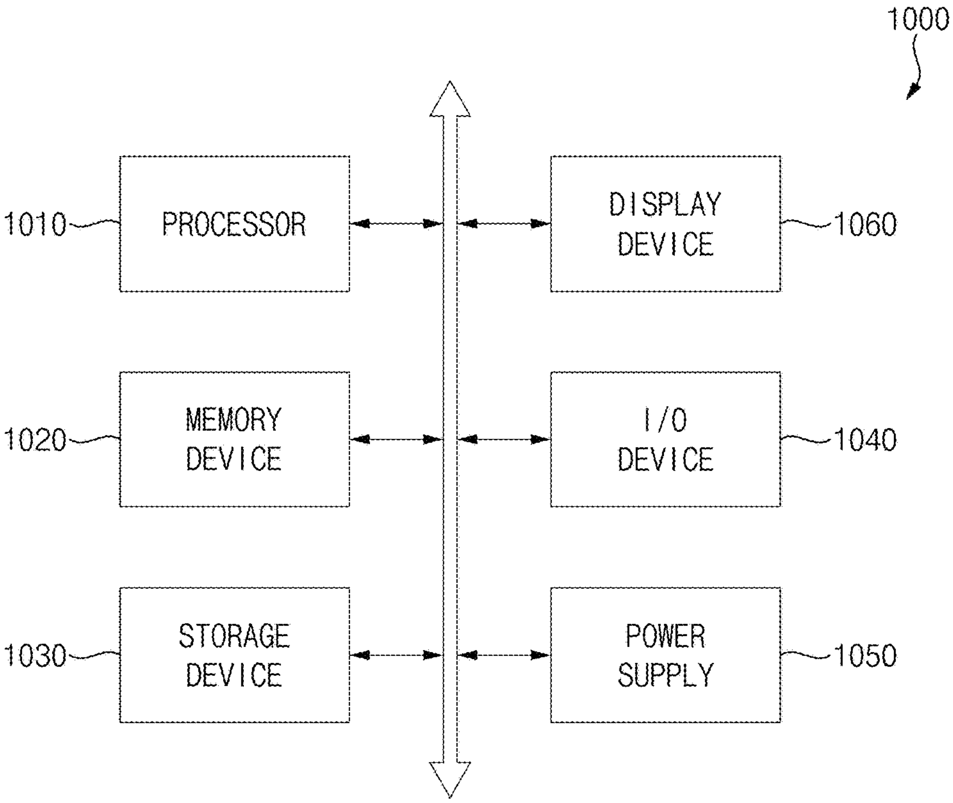
FIG. 8 is a block diagram showing an electronic device 1000 according to an embodiment of the present disclosure.
Figure 9:
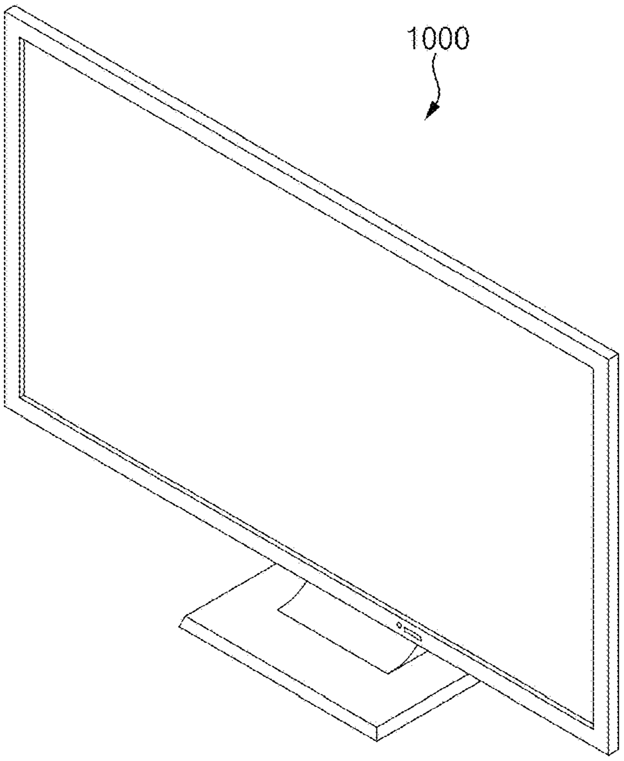
FIG. 9 is a view showing one example in which the electronic device 1000 of FIG. 8 is implemented as a computer monitor.

FIG. 8 is a block diagram showing an electronic device 1000 according to an embodiment of the present disclosure. FIG. 9 is a view showing one example in which the electronic device 1000 of FIG. 8 is implemented as a computer monitor.

Referring to FIGS. 8 and 9, an electronic device 1000 may include a processor 1010, a memory device 1020, a storage device 1030, an input/output (I/O) device 1040, a power supply 1050, and a display device 1060. The display device 1060 may correspond to the display device 100 of FIG. 1. The electronic device 1000 may further include a plurality of ports capable of communicating with a video card, a sound card, a memory card, a USB device, and the like, or communicating with other systems.

According to an embodiment, as shown in FIG. 9, the electronic device 1000 may be implemented as a computer monitor. However, the present disclosure is not limited thereto, and according to another embodiment, the electronic device 1000 may be implemented as a television, a mobile phone, a video phone, a smart pad, a smart watch, a tablet PC, a vehicle navigation, a laptop computer, a head-mounted display device, or the like.

The processor 1010 may perform specific calculations or tasks. According to an embodiment, the processor 1010 may be a microprocessor, a central processing unit (CPU), or the like. The processor 1010 may be connected to other components through an address bus, a control bus, a data bus, or the like. According to an embodiment, the processor 1010 may also be connected to an expansion bus such as a peripheral component interconnect (PCI) bus. According to an embodiment, the processor 1010 may provide first image data (IMD1 of FIG. 1), a data enable signal (DE of FIG. 1), a clock signal (CLK of FIG. 1), a vertical synchronization signal (VSYNC of FIG. 1), a horizontal synchronization signal (HSYNC of FIG. 1), and the like to the display device 1060.

The memory device 1020 may store data required for an operation of the electronic device 1000. For example, the memory device 1020 may include: a non-volatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), and a ferroelectric random access memory (FRAM); and/or a volatile memory device such as a dynamic random access memory (DRAM), a static random access memory (SRAM), and a mobile DRAM.

The storage device 1030 may include a solid state drive (SSD), a hard disk drive (HDD), a CD-ROM, and the like. The I/O device 1040 may include: an input device such as a keyboard, a keypad, a touch pad, a touch screen, and a mouse; and an output device such as a speaker and a printer. The power supply 1050 may supply a power required for the operation of the electronic device 1000. The display device 1060 may be connected to other components through the buses or other communication links.

The display device 1060 may be configured such that a voltage level of an initialization voltage or a voltage level of a data voltage, which is provided to a pixel, is altered in an overlapping period in which an active period and an initialization period overlap each other, so that a driving current of the pixel may be compensated for, and a luminance difference within a display panel may be reduced.

The display device according to the embodiments may be applied to a display device included in a computer, a notebook, a mobile phone, a smart phone, a smart pad, a PMP, a PDA, an MP3 player, or the like.

Although the display devices and the methods of driving the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display device comprising:

a display panel including a pixel;

a gate driver configured to provide a scan signal and a sensing signal to the pixel;

a data driver configured to provide a data voltage to the pixel;

a power manager configured to provide an initialization voltage to the pixel; and a controller configured to control the gate driver, the data driver, and the power manager, wherein the gate driver is configured to provide the scan signal and the sensing signal to the pixel in an active period in which the data voltage is provided to the pixel, and provide the sensing signal to the pixel in an initialization period that repeatedly starts during a blank period in which the data voltage is not provided to the pixel, the controller is configured to determine an overlapping period in which the active period and the initialization period overlap each other based on a progress time of the initialization period at a start time point of the active period, and the power manager is configured to change a voltage level of the initialization voltage in the overlapping period.

2. The display device of claim 1, wherein the power manager is configured to reduce the voltage level of the initialization voltage in the overlapping period.

3. The display device of claim 1, wherein a length of the overlapping period has a value obtained by subtracting the progress time of the initialization period from a length of the active period.

4. The display device of claim 1, wherein the controller is configured to calculate the progress time of the initialization period by counting a clock signal from a start time point of the initialization period to the start time point of the active period.

5. The display device of claim 1, wherein a length of the blank period is altered according to a driving frequency.

6. The display device of claim 5, wherein the length of the blank period gradually increases as the driving frequency decreases.

7. The display device of claim 1, wherein the pixel includes:

a first transistor including a gate electrode connected to a first node, a first electrode configured to receive a first power voltage, and a second electrode connected to a second node;

a second transistor including a gate electrode configured to receive the scan signal, a first electrode configured to receive the data voltage, and a second electrode connected to the first node;

a third transistor including a gate electrode configured to receive the sensing signal, a first electrode configured to receive the initialization voltage, and a second electrode connected to the second node;

a storage capacitor including a first electrode connected to the first node and a second electrode connected to the second node; and a light emitting diode including a first electrode connected to the second node and a second electrode configured to receive a second power voltage.

8. A display device comprising:

a display panel including a pixel;

a gate driver configured to provide a scan signal and a sensing signal to the pixel;

a data driver configured to provide a data voltage to the pixel;

a power manager configured to provide an initialization voltage to the pixel; and a controller configured to control the gate driver, the data driver, and the power manager, wherein the gate driver is configured to provide the scan signal and the sensing signal to the pixel in an active period in which the data voltage is provided to the pixel, and provide the sensing signal to the pixel in an initialization period that repeatedly starts during a blank period in which the data voltage is not provided to the pixel, the controller is configured to determine an overlapping period in which the active period and the initialization period overlap each other based on a progress time of the initialization period at a start time point of the active period, and the power manager is configured to change a voltage level of the data voltage in the overlapping period.

9. The display device of claim 8, wherein the data driver is configured to increase the voltage level of the data voltage in the overlapping period.

10. The display device of claim 8, wherein the power manager is configured to maintain a voltage level of the initialization voltage in the overlapping period.

11. The display device of claim 8, wherein a length of the overlapping period has a value obtained by subtracting the progress time of the initialization period from a length of the active period.

12. The display device of claim 8, wherein the controller is configured to calculate the progress time of the initialization period by counting a clock signal from a start time point of the initialization period to the start time point of the active period.

13. The display device of claim 8, wherein a length of the blank period is altered according to a driving frequency.

14. The display device of claim 13, wherein the length of the blank period gradually increases as the driving frequency decreases.

15. The display device of claim 8, wherein the pixel includes:

a first transistor including a gate electrode connected to a first node, a first electrode configured to receive a first power voltage, and a second electrode connected to a second node;

a second transistor including a gate electrode configured to receive the scan signal, a first electrode configured to receive the data voltage, and a second electrode connected to the first node;

a third transistor including a gate electrode configured to receive the sensing signal, a first electrode configured to receive the initialization voltage, and a second electrode connected to the second node;

a storage capacitor including a first electrode connected to the first node and a second electrode connected to the second node; and a light emitting diode including a first electrode connected to the second node and a second electrode configured to receive a second power voltage.

16. A method for driving a display device, the method comprising:

providing a scan signal and a sensing signal to a pixel in a first active period;

providing the sensing signal to the pixel in an initialization period that repeatedly starts during a blank period following the first active period;

determining whether a second active period and the initialization period overlap each other based on a progress time of the initialization period at a start time point of the second active period following the blank period; and changing a voltage level of an initialization voltage provided to the pixel or a voltage level of a data voltage provided to the pixel in an overlapping period in which the second active period and the initialization period overlap each other.

17. The method of claim 16, wherein the voltage level of the initialization voltage is reduced in the overlapping period.

18. The method of claim 16, wherein, in the overlapping period, the voltage level of the data voltage increases, and the voltage level of the initialization voltage is maintained.

19. The method of claim 16, wherein a length of the overlapping period has a value obtained by subtracting the progress time of the initialization period from a length of the second active period.

20. The method of claim 16, further comprising calculating a progress time of the blank period by counting a clock signal from a start time point of the blank period, wherein the initialization period repeatedly starts when the progress time of the blank period is greater than a predetermined time.

* * * * *